Jan. 17, 1950     M. AMBARCUMIAN     2,494,735
MECHANISM FOR TRANSFERRING A BODY FROM A TRAILER
CHASSIS TO A TRUCK CHASSIS, AND VICE VERSA
Filed April 13, 1946     2 Sheets-Sheet 1
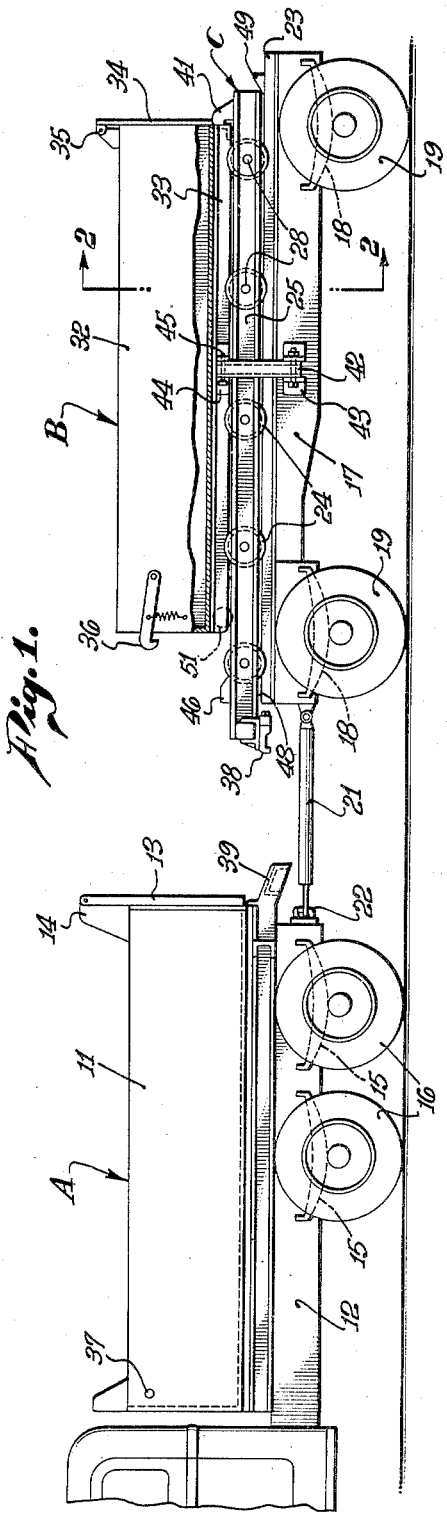
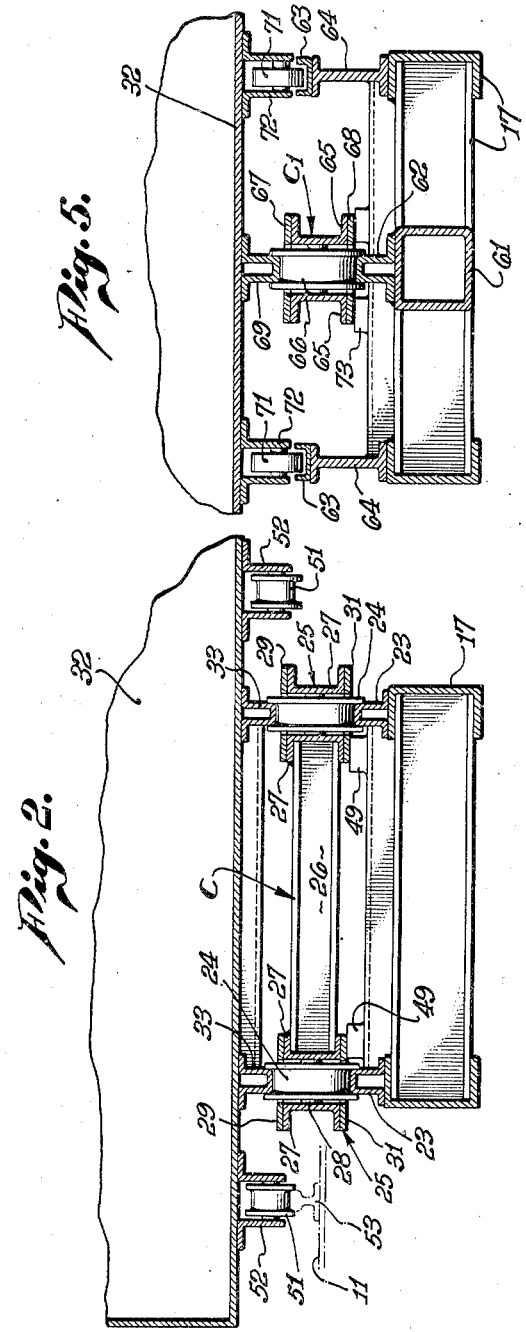
INVENTOR
MICHAEL AMBARCUMIAN,
BY Edwin D. Jones
ATTORNEY

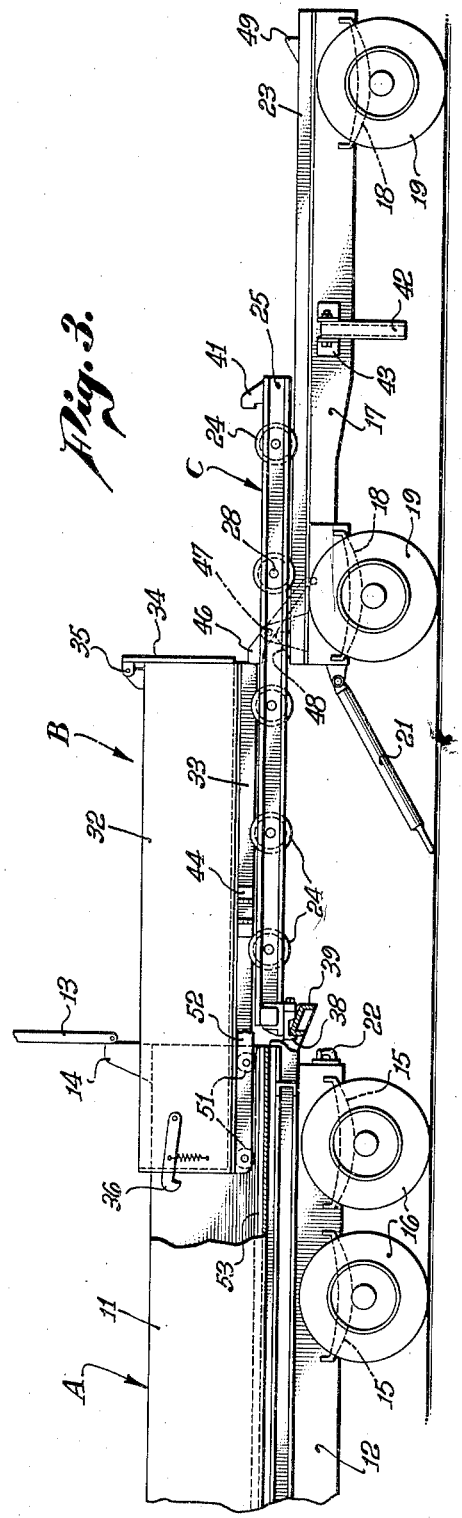

Patented Jan. 17, 1950

2,494,735

UNITED STATES PATENT OFFICE 2,494,735

MECHANISM FOR TRANSFERRING A BODY FROM A TRAILER CHASSIS TO A TRUCK CHASSIS, AND VICE VERSA

Michael Ambarcumian, Los Angeles, Calif.

Application April 13, 1946, Serial No. 661,921

14 Claims. (Cl. 214—38)

My invention relates to motor vehicles and trailer vehicles therefor, and particularly to mechanism for transferring the body of a trailer from the trailer chassis to a truck chassis and returning it thereafter to the trailer chassis. Such a mechanism with various modifications, is described in co-pending application for United States Letters Patent, Serial No. 652,848, filed March 8, 1946, by Henry C. Harbers and now Patent No. 2,478,658 granted August 9, 1949, wherein the load-containing body of a trailer is mounted removably upon the trailer chassis and may be moved therefrom to be telescopically entered into the body of a truck when the latter has been emptied, then to be transported to an unloading point. The actuating means for effecting the transfer, as described in the aforesaid application, comprises cable and sheave means which functions to move the trailer body at least twice the distance the sub-frame moves, thereby minimizing manipulation of the truck to effect the transfer.

It is a purpose of my invention to provide a transferring mechanism of the type described in which the actuating means are still further simplified, while retaining the advantages of speed and ease of operation.

Another purpose of my invention is the provision of a trailer body transferring mechanism which is operable to propel or move the trailer body a greater distance than the sub-frame is moved by the truck, and without the use of cables and sheaves to gain mechanical advantages otherwise unobtainable.

To effect the above purposes and others which will appear hereinafter I have embodied my invention in a mechanism which includes a transferring or sub-frame having wheels or rollers, by which it may be moved longitudinally of the trailer chassis on rails provided on the latter therefor, and which extend above the upper surface of the sub-frame to engage rails on the lower surface of the trailer body, thereby supporting and propelling the body in the same direction as the sub-frame is moved and at a greater velocity, and, hence a greater distance than that of the sub-frame. I have also provided lifting means by which, when the sub-frame is approximately in its normal or road-travelling position, the rollers may be disengaged from the chassis rails to receive the trailer body without requiring further movement of the sub-frame.

I will describe one embodiment of my invention and a modification thereof, and will then point out the novel features thereof in claims, it being understood that further modifications may be within the scope of my claims.

In the accompanying drawings:

Fig. 1 is a view showing in side elevation a trailer coupled to a truck in the conventional manner, part of the trailer body being cut away to show details of the body transfer mechanism.

Fig. 2 is a transverse sectional view on the line 2—2 of Fig. 1, illustrating a preferred arrangement of the wheels and rails comprised in the transfer mechanism.

Fig. 3 is a view similar to Fig. 1, illustrating an intermediate position of the trailer body in the transfer thereof to the truck.

Fig. 4 is a view similar to Fig. 1, illustrating an intermediate position of the trailer body in the re-transfer thereof from the truck to the trailer.

Fig. 5 is a transverse sectional view similar to Fig. 2, illustrating a modified arrangement of the wheels and rails of the transfer mechanism.

Having specific reference to Figs. 1 to 4 of the drawings, this embodiment of my invention comprises a conventional dump truck, designated generally at A, and my improved form of trailer designated generally at B. The truck A has a box-like body 11 pivotally supported at its rearward end on a chassis frame 12 and hoistable forwardly by conventional hoisting apparatus (not shown). The body 11 is normally closed by a tail-gate 13, pivoted on brackets 14, and adapted to be held open, when so desired, by any suitable means. The frame 12 is spring-mounted by springs 15 upon wheels 16. Similarly the trailer B has a chassis frame 17 spring-mounted by springs 18 upon wheels 19, steerable in the conventional manner, and has a draw-bar 21 by which it may be coupled to a pintle 22 on the truck frame 12.

The trailer chassis frame 17 is provided with rails 23 secured thereto adjacent to the lateral margins of its upper surface and parallel to its longitudinal axis. A transferring or sub-frame C is mounted upon the rails 23 to be moveable therealong by means of flanged wheels 24. The sub-frame C is of rectangular configuration and may be formed of side-members 25 and transverse end members 26. The side-members 25 may comprise channel beans 27 placed back to back to support the wheels 24 in spaced journals 28 and structurally connected by upper and lower plates 29 and 31, which are slotted to permit the wheels 24 to extend upwardly and downwardly through them.

The trailer B has a trailer body 32 supported on the wheels 24 by means of rails 33. The body 32 is similar in conformation to the truck body 11 but is proportioned to be telescopically slidable within the latter. It is provided with a similar tailgate 34 pivoted as at 35, and with one or more latches 36 which are engageable with a keeper bar 37 in the truck body 11 when the trailer body is fully telescoped within the truck body to retain the trailer body in that position.

Coupling means are provided for coupling the sub-frame C to the truck body 11, and it comprises a hook 38 on the forward transverse member 26 engageable with a ramp 39 secured to the truck body 11 and arcuately moveable therewith when the truck body is tilted. One or more stops 41 are provided at the rearward end of the sub-frame C, to retain the trailer body 32 thereon; and hasps 42 are pivoted in brackets 43 secured to opposite sides of the trailer chassis frame 17 to retain the trailer body 32 in road-travelling position, they being detachably held thereto by other brackets 44 pierced by removable pins 45. Also embodied in the transfer mechanism is an unbalanced lever 46 pivotally mounted adjacent its forward end, as at 47, on the forward end of the trailer chassis frame 17 so as to extend upwardly therefrom.

Ramps 48 fixed on the forward end of the trailer chassis frame 17, are spaced to engage the forward transverse end member 26 of the sub-frame C, and similar ramps 49 fixed on the rearward end of the trailer chassis frame, are spaced to engage the inner lower faces of the side members 25. Ramps 48 and 49 are spaced longitudinally on the trailer chassis frame so as to engage simultaneously the end member 26 and the side member 25, when the sub-frame C is moved rearwardly of its normal road-travelling position.

Outwardly of and alined parallel to the rails 33 are flanged wheels 51 journalled in brackets 52 and alined to engage rails 53 (shown in dotted lines in Fig. 2) on the floor of the truck body 11.

In operation, assuming that both truck A and trailer B are loaded, and coupled by the drawbar 21, and have reached the scene of unloading, the truck is uncoupled from the trailer and is unloaded in the usual manner. To then unload the trailer, the driver backs the truck up to the trailer in longitudinal alinement therewith. Because the trailer is still loaded and the truck is unloaded, the springs 18 of the trailer chassis will be depressed, and the wheels 51 on the trailer body will be below the rails 53 in the truck body. The hook 38 will ride up on the ramp 39 to engage it and couple the sub-frame C to the truck body, and in so doing it will raise the sub-frame and the trailer body so that the wheels 51 are in position to engage the rails 53. The springs 18 will react to the raising of the load upon them, by raising the trailer chassis frame 17 to maintain the rails 23 in contact with the wheels 24.

After the truck body and trailer sub-frame have been thus coupled (see Fig. 3), and the tail gate 13 opened, and the hasps 42 disengaged from the brackets 44, the truck is moved forwardly to the position shown in Fig. 3, drawing forwardly with it the sub-frame which, of course, rolls on the rails 23 by means of the wheels 24. The wheels 24 being thus caused to turn by the friction of the rails 23 on their lower peripheries, exert forward pressure upon the rails 33 through their upper peripheries and cause the trailer body 32 to advance along the sub-frame towards the truck. It will be seen that as the sub-frame C advances relative to the trailer chassis frame 17 a distance equal to the circumference of one of the wheels 24, the trailer body 32 will advance the same distance relative to the sub-frame, and, therefore, twice that distance relative to the trailer chassis frame.

The motion thus imparted to the trailer body is, therefore, vigorous, having as a possibility twice the velocity with which the truck moves forward, and twice the distance, although some allowance must be made for wheel-slippage and inertia. The momentum thus generated will carry the trailer body beyond such of the wheels 24 as actually are imparting motion to it so that it rolls freely on those of the wheels 24 which have disengaged from the rails 23, with the forward end of the trailer body entering the truck body and being supported therein by the wheels 51 upon the rails 53. During this movement the unbalanced lever 46 will be depressed by the trailer body moving over it, but will return to its normal position when the trailer body has passed beyond it, and will then be in position to engage the rearward end of the trailer body and prevent rearward motion of that body relative to the trailer chassis.

With the trailer body thus partly telescopically entered into the truck body and partly supported thereby and restrained from rearward movement, the truck is then backed against the trailer chassis. This movement causes the sub-frame C to be moved rearwardly to its original position, while the trailer body is forced into the truck body and the latches 36 engage the keeper bar 37 to prevent recoil. As the weight of the loaded trailer body is now transferred from the trailer springs 18 to the truck springs 15, the coupling hook 38 will rise relative to the ramp 39 and uncouple the trailer from the truck.

The truck may now be moved to the unloading point, the tail-gate 34 raised, and the trailer body unloaded in the usual manner. The latches 36 will retain the trailer body within the truck body when the latter is tilted for dumping.

To replace the trailer body upon the trailer chassis, the truck is again backed into alinement with the trailer. The sub-frame C will have been pushed back to its normal road-travelling position during the final loading of the trailer body into the truck body, and it is now pushed rearwardly a little further so that the rearward ends of the side members 25 are forced upwardly upon the ramps 49 and the forward transverse member 26 is forced upwardly upon the ramps 48. The sub-frame is thus raised slightly to disengage the wheels 24 from the rails 23.

When now the latches 36 are lifted from the keeper bar 37 and the truck body is tilted in the manner shown in Fig. 4, the trailer body will roll by gravity onto the sub-frame. As the wheels 24 are not in contact with the rails 23 they are free to turn and to provide roller bearings for the rails 33 on which the trailer body may roll rearwardly until stopped by the stops 41. The weight of the trailer body together with a brief pull by the truck upon the sub-frame will cause the latter to slide from the ramps 48 and 49, and the hasps 42 may be refastened to hold the trailer body in road-travelling position.

As the ramp 39 is arcuately moveable with the truck body, it may be moved out of engagement with the hook 38 by the tilting of the truck body, and the truck may be moved forward to be coupled to the trailer by the drawbar 21 in the ordinary manner.

Referring now to Fig. 5, I have here shown a modified construction of the sub-frame designated generally as C1, and cooperating modifications of the trailer chassis frame and trailer body to render support to the latter. The trailer chassis from 17 is provided centrally with a longitudinal supporting member 61 upon which is secured a rail 62. Additional rails 63, in the form of channels, are secured to I-beams 64 on the lateral margins of the chassis frame.

The sub-frame C1 comprises a single member having a construction similar to that of the side members 25 of my preferred construction, with channel beams 65 placed back to back to support wheels 66, and structurally connected by upper and lower plates 67 and 68, which are slotted to permit the wheels 66 to extend upwardly and downwardly through them. A single rail 69, secured centrally to the trailer body 32, supports the trailer body upon the wheels 66, while wheels 71, journalled in brackets 72 on the trailer body, are alined to run in the channel rails 63.

The wheels 71 extend downwardly below the rail 69, but the I-beams 64 are so proportioned that the channel rails 63 do not quite make contact with the wheels 71 when the trailer body is supported by the rail 69 and wheels 66. That is to say, the trailer body will normally derive its principal support from the wheels 66, with the wheels 71 rendering lateral support on either side toward which the trailer body may incline laterally. The wheels 71 are not flanged like the wheels 51, but are flat-rimmed, as they are designed to run in the channel rails 63, and, therefore, they may, when extended into the truck body 11 run on the floor thereof without requiring rails such as rails 53. Ramps 73 are secured to the rearward end of the trailer chassis frame, and disposed so as to engage and lift the sub-frame, when the latter is moved rearwardly of its normal road-travelling position.

Transfer of the trailer body 32 to the truck body 11 is accomplished in the manner herein described in connection with my preferred embodiment, with the exception that the trailer body is rolled into the truck body with the wheels 71 in direct contact with the floor thereof and not upon rails. Pulling the sub-frame C1 forwardly causes the wheels 66 to rotate upon the rail 62 and thereby to propel the trailer body forwardly through action upon the rail 69. The same operations by the driver as hereinbefore described, will also retransfer the trailer body to the trailer chassis. When the trailer body rolls from the tilted truck body it is, of course, similarly tilted, and the wheels 71 being below the rail 69, they will engage the rails 63 before the rail 69 engages the wheels 66, and will support the trailer body and allow it to roll freely until it is entirely discharged from the truck body and axially parallel to the sub-frame.

While the operation of the trailer body transfer mechanism will normally be as herein described for both the preferred and modified embodiments of my invention, it is quite possible for a skilled driver to transfer the trailer body to the truck body with a single forward movement of the truck, owing to the momentum developed when the trailer body is propelled forwardly at twice the velocity of the truck.

Although I have herein shown and described only one form of trailer body transferring mechanism embodying my invention, it is to be understood that various changes and modifications may be made therein without departing from the spirit of my invention and the spirit and scope of the appended claims.

I claim:

1. In a mechanism for transferring a body from a trailer chassis to a truck chassis and vice versa; rail means on said trailer chassis; a tranferring frame; wheel means on said frame engaging said rail means for moving said frame relatively to said chassis; said body being supported upon said wheel means for movement relative to said frame, and ramp means on said trailer chassis for disengaging said wheel means from the rail means on the trailer chassis at a selected position of said transferring frame.

2. In a mechanism for transferring a body from a trailer chassis to a truck chassis and vice versa; rails on the lateral margins of said trailer chassis parallel to the longitudinal axis of said chassis; a transferring frame; and wheel means on said frame engaging said rails for moving said frame relatively to said chassis, said body being supported upon said wheel means for movement relative to said frame, and camming means on said trailer chassis engageable by said frame during the rearward movement thereof for disengaging said wheel means from the rail means on the trailer chassis.

3. In a mechanism for transferring a body from a trailer chassis to a truck chassis and vice versa; rails on the lateral margins of said trailer chassis parallel to the longitudinal axis of said chassis; a transferring frame; and wheel means on said frame extending thereabove and therebelow, engaging said rails with their lower periphery for moving said frame relative to said chassis; said body being supported upon the upper periphery of said wheel means for movement relative to said frame, and ramp means on said trailer chassis for disengaging the lower peripheries of said wheel means from the rail means on the trailer chassis at a selected position of said frame.

4. In a mechanism for transferring a body from a trailer chassis to a truck chassis and vice versa; a rail on said trailer chassis at and parallel to the longitudinal axis thereof; a transferring frame; wheel means on said frame extending thereabove and therebelow engageable with said rail with their lower peripheries for moving said frame relatively to said chassis; said body being supportable upon the upper peripheries of said wheel means for movement relative to said frame; additional rails on said chassis adjacent the lateral margins thereof and parallel to said first mentioned rail; and wheels on said body engageable with said additional rails to render lateral support to said body when said body is unsupported by said wheel means and to render such support on one side or the other of said body, but not on both sides when said body is supported by said wheel means.

5. In a mechanism for transferring a body from a trailer chassis to a truck chassis and vice versa; a first rail on said trailer chassis at and parallel to the longitudinal axis thereof; a transferring frame; wheel means on said frame extending thereabove and therebelow engageable with said first rail with their lower peripheries for moving said frame relatively to said chassis; a second rail on said body alined with said first rail and engageable with the upper peripheries of said wheel means for movement of said body relative to said frame; additional rails on said chassis adjacent the lateral margins thereof and parallel to said first rail; and wheels on said body engageable with said additional rails to render lateral support to said body when said second rail is disengaged from said wheel means, and to render such support on one side or the other of said body, but not on both sides when said second rail is engaged by said wheel means.

6. In a mechanism for transferring a body from a trailer chassis to a truck chassis and vice versa; rail means on said trailer chassis parallel to the longitudinal axis thereof; a transferring frame; wheel means on said frame engageable with said rail means for moving said frame thereon relative to said chassis; said body being supported upon said wheel means for movement relative to said frame; and ramp means so positioned on said chassis as to disengage said wheel means from said rail means, when said transferring frame is moved rearwardly beyond its normal road-travelling position.

7. In a mechanism for transferring a body from a trailer chassis to a truck chassis and vice versa; rails on said trailer chassis adjacent the lateral margins thereof and parallel to the longitudinal axis thereof; a transferring frame wheel means on said frame extending thereabove and therebelow and engageable with said rails with their lower peripheries for moving said frame relatively to said chassis; additional rails on said body alined with said first-mentioned rails engageable with the upper peripheries of said wheel means for movement of said body relative to said frame; and ramp means so positioned on said chassis as to disengage said wheel means from said first mentioned rails when said transferring frame is moved rearwardly beyond its normal road-travelling position.

8. In a mechanism for transferring a body from a trailer chassis to a truck chassis and vice versa; a rail on said trailer chassis at and parallel to the longitudinal axis thereof; a transferring frame; wheel means on said frame extending thereabove and therebelow engageable with said rail with their lower peripheries for moving said frame relatively to said chassis; said body being supportable upon the upper peripheries of said wheel means for movement relative to said frame; additional rails on said chassis adjacent the lateral margins thereof and parallel to said first mentioned rail; wheels on said body engageable with said additional rails to render lateral support to said body when said body is unsupported by said wheel means and to render such support on one side or the other of said body but not on both sides when said body is supported on said wheel means; and ramp means so positioned on said chassis as to disengage said wheel means from said first mentioned rail, when said transferring frame is moved rearwardly beyond its normal road-travelling position.

9. In a mechanism for transferring a body from a trailer chassis to a truck chassis and vice versa; a first rail on said trailer chassis at and parallel to the longitudinal axis thereof; a transferring frame; wheel means on said frame extending thereabove and therebelow engageable with said first rail with their lower peripheries for moving said frame relatively to said chassis; a second rail on said body alined with said first rail engageable with the upper peripheries of said wheel means for movement of said body relative to said frame; additional rails on said chassis adjacent the lateral margins thereof and parallel to said first rail; wheels on said body engageable with said additional rails to render lateral support to said body when said second rail is disengaged from said wheel means, and to render such support on one side or the other of said body but not on both sides when said second rail is engaged by said wheel means; and ramp means so positioned on said chassis as to disengage said wheel means from said first rail, when said transferring frame is moved rearwardly beyond its normal road-travelling position.

10. In a mechanism for transferring a body from a trailer chassis to a truck chassis and vice versa; rails on said trailer chassis adjacent the lateral margins thereof and parallel to the longitudinal axis thereof; a transferring frame; wheel means on said frame extending thereabove and therebelow and engageable with said rails with their lower peripheries for moving said frame relatively to said chassis; additional rails on said body alined with said first-mentioned rails engageable with the upper peripheries of said wheel means for movement of said body relative to said frame; and camming means for disengaging the lower peripheries of said wheel means at a selected position of said transferring frame.

11. In a mechanism for transferring a body from a trailer chassis to a truck chassis and vice versa; a rail on said trailer chassis at and parallel to the longitudinal axis thereof; a transferring frame; wheel means on said frame extending thereabove and therebelow engageable with said rail with their lower peripheries for moving said frame relatively to said chassis; said body being supportable upon the upper peripheries of said wheel means for movement relative to said frame; additional rails on said chassis adjacent the lateral margins thereof and parallel to said first mentioned rail; wheels on said body engageable with said additional rails to render lateral support to said body when said body is unsupported by said wheel means and to render such support on one side or the other of said body, but not on both sides when said body is supported on said wheel means; and means for disengaging the lower peripheries of said wheel means at a selected position of said transferring frame.

12. In a mechanism for transferring a body from a trailer chassis to a truck chassis and vice versa; a first rail on said trailer chassis at and parallel to the longitudinal axis thereof; a transferring frame; wheel means on said frame extending thereabove and therebelow engageable with said first rail with their lower peripheries for moving said frame relatively to said chassis; a second rail on said body alined with said first rail engageable with the upper peripheries of said wheel means for movement of said body relative to said frame; additional rails on said chassis adjacent the lateral margins theerof and parallel to said first rail; wheels on said body engageable with said additional rails to render lateral support to said body when said second rail is disengaged from said wheel means, and to render such support on one side or the other of said body, but not on both sides when said second rail is engaged by said wheel means; and means for disengaging the lower peripheries of said wheel means at a selecteed position of said transferring frame.

13. In combination: a truck; a trailer chassis; a body removably mounted on the trailer chassis; and cooperative means in association with a truck, the trailer chassis and the trailer body so constructed and arranged that the trailer body may be transferred to the truck chassis, and vice versa, by moving the truck toward and away from the trailer, said means including a frame between the chassis and the body, a pair of rails on the upper side of the chassis, a second pair of rails on the lower side of the body, and rollers mounted in the frame and interposed between the rails of the chassis and the rails of the body, so as to support the frame for rolling movement longitudinally on the chassis and the body for longitudinal rolling movement on the frame, whereby when the frame is moved on the chassis by the truck the rollers will cause the body to be moved at twice the speed of the frame, camming means adjacent the ends of said trailer chassis engageable with the frame during movement thereof for disengaging said rollers from the rails on the trailer chassis.

14. In combination: a truck; a trailer chassis; a body removably mounted on the trailer chassis; and cooperative means in association with a truck, the trailer chassis and the trailer body so constructed and arranged that the trailer body may be transferred to the truck chassis, and vice versa, by moving the truck toward and away from the trailer, said means including a center rail longitudinally on the upper side of said chassis, a pair of rails on the under side of said chassis at opposite sides of the center rail, a frame between said chassis and said body having rollers for mounting the frame for longitudinal rolling movement on said center rail, a rail on the under side of said body engaging said rollers so that the latter support the body for rolling movement on said frame, rollers on the under side of said body engageable with said pair of rails to render lateral support to said body when the latter is unsupported by the first mentioned rollers, and to render such support on the one side or the other of said body but not on both sides when said body is supported by said first mentioned rollers.

MICHAEL AMBARCUMIAN.

REFERENCES CITED

The following references are of record in the file of this patent:

UNITED STATES PATENTS

| Number | Name | Date |
|---|---|---|
| 1,773,881 | Smalley | Aug. 26, 1930 |
| 1,915,883 | Fager | June 27, 1933 |
| 2,033,119 | Bennett | Mar. 10, 1936 |

FOREIGN PATENTS

| Number | Country | Date |
|---|---|---|
| 471,071 | Germany | Feb. 5, 1929 |